UNITED STATES PATENT OFFICE.

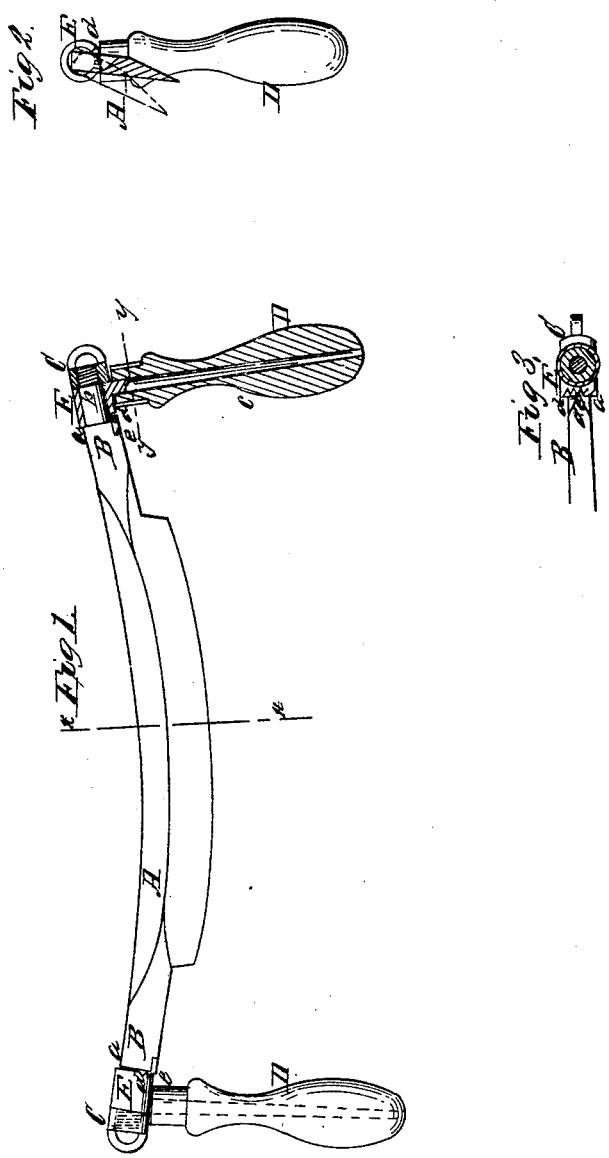
R. N. Watrous,
Spoke Shave.
No. 18,877. Patented Dec. 15, 1857.

RICHARD N. WATROUS, OF CHARLESTOWN, OHIO.

DRAWING-KNIFE.

Specification of Letters Patent No. 18,877, dated December 15, 1857.

*To all whom it may concern:*

Be it known that I, RICHARD N. WATROUS, of Charlestown, in the county of Portage and State of Ohio, have invented a new and useful Improvement in Draw-Knives for the Use of Carpenters, Coopers, Wheelwrights, and other Artisans in Wood; and I do hereby declare that the following is a full, clear, and exact description of the same, reference being had to the annexed drawings, making a part of this specification, in which—

Figure 1, is a face view of a draw knife, one of the handles of ditto being bisected longitudinally showing my invention. Fig. 2, is a transveres section of the knife taken in the line $(x)$ $(x)$ Fig. 1. Fig. 3, is an inner edge view of one of the tangs of the knife, the handle being bisected as indicated by the line $(y)$ $(y)$ Fig. 1.

Similar letters of reference indicate corresponding parts in the several figures.

This invention consists in attaching the handles of a draw knife to its tangs in such a way that the position of the blade may be varied relatively with its handles, and the blade placed at a greater or less angle relatively with the "work" as may be desired without affecting the proper position of the handles.

To enable those skilled in the art fully understand and construct my invention I will proceed to describe it.

A represents the knife or blade constructed in the usual manner, and provided at each end with a tang B, on each of which a shoulder $(a)$ is formed, said shoulders being formed by having the outer ends or parts $(b)$ of the tangs made of smaller diameter, as shown clearly in Fig. 1.

The outer ends of the parts $(b)$ of the tangs have each a screw cut on them to receive a thumb nut C.

D, D, are the handles of the drawknife. The handles are of the usual construction and each has an eye or loop E at its upper end. The eyes or loops E are secured to the handles D, D, by tangs $(c)$ which pass entirely through the handles longitudinally and are riveted or headed at their outer ends.

The eyes or loops E are fitted on the parts $(b)$ of the tangs and are allowed when free to turn thereon. The inner edge of each eye or loop E is serrated or notched, about half the distance of its circumference, the lower or inner half as shown at $(d)$ and on each tang B a point or stop $(e)$ is formed, see Figs. 1 and 3. These points or stops are formed on the inner edges of the tangs and are produced by filing or swaging so as to form projections, the outer ends or points of which will extend a trifle over on the parts $(b)$ and catch in the notches $(d)$ in the inner edges of the eyes or loops E, see Fig. 3,— the eyes or loops being kept up snugly against the points or stops $(d)$ by screwing up the thumb nuts C.

In consequence of the points or stops $(e)$ catching into the notches in the eyes or loops E, the handles are prevented from turning on the parts $(b)$ of the tangs and by unscrewing the nuts C, the handles and blade may be adjusted relatively with each other as desired so that the blade of the knife may have a greater or less "rake" or be placed more or less angularly with the work, the position of the handles being always the same so that the operator can always use the implement to the best advantage as regards the application of his power or strength while the blade may be adjusted as the nature of the work requires.

When working in soft wood the blade of the knife may be set quite angularly with the work so as to cut deep and take off large chips or masses of wood, but in working in hard wood the implement must be made to cut comparatively shallow. There has not been hitherto, so far as I am aware, any mechanical means devised for adjusting the blade so as to suit the work, the operator being obliged to effect the result by changing the position of the handles, raising or depressing them more or less while using the implement. This fatigues the operator, tires the muscles of the wrists and good work cannot be done with any degree of facility. By my improvement this objection is obviated and the draw knife rendered a much more efficient implement than heretofore.

Having thus described my invention, what I claim as new and desire to secure by Letters Patent, is;

Attaching the handles to the knife substantially as herein shown and described or in any equivalent way whereby the relative position of the blade and handles may be varied as occasion may require or the nature of the work may demand.

RICHARD N. WATROUS.

Witnesses:
ANSEL SHIPMAN,
L. B. SOUTHWORTH.